US011757807B2

(12) United States Patent
Bhardwaj et al.

(10) Patent No.: US 11,757,807 B2
(45) Date of Patent: Sep. 12, 2023

(54) INTERACTIVE CHATBOT FOR MULTI-WAY COMMUNICATION

(71) Applicant: OLX Global B.V., Amsterdam (NL)

(72) Inventors: Bhagirath Bhardwaj, Haryana (IN); Varun Mittal, Rajasthan (IN); Rakesh Bobbati, Telangana (IN); Anil Kumar, Rajasthan (IN); Vibhor Gaur, New Delhi (IN)

(73) Assignee: OLX GLOBAL B.V., Amsterdam (NL)

( * ) Notice: Subject to any disclaimer, the term of this patent is extended or adjusted under 35 U.S.C. 154(b) by 50 days.

(21) Appl. No.: 17/367,715

(22) Filed: Jul. 6, 2021

(65) Prior Publication Data
US 2022/0247700 A1   Aug. 4, 2022

Related U.S. Application Data

(63) Continuation-in-part of application No. 17/164,931, filed on Feb. 2, 2021, now Pat. No. 11,477,141.

(51) Int. Cl.
*H04L 51/02* (2022.01)
*G06F 16/9032* (2019.01)
*G06N 20/00* (2019.01)
*H04L 51/046* (2022.01)
*G06F 18/2413* (2023.01)

(52) U.S. Cl.
CPC ........ *H04L 51/02* (2013.01); *G06F 16/90332* (2019.01); *G06F 18/2413* (2023.01); *G06N 20/00* (2019.01); *H04L 51/046* (2013.01)

(58) Field of Classification Search
CPC ....... H04L 51/02; H04L 51/046; H04L 51/04; G06N 20/00; G06N 3/044; G06N 3/045; G06N 3/08; G06F 18/2413; G06F 40/216; G06F 40/284; G06F 40/35; G06F 16/90332
See application file for complete search history.

(56) References Cited

U.S. PATENT DOCUMENTS

| 2009/0162824 A1* | 6/2009 | Heck | G06Q 10/10 |
| | | | 434/362 |
| 2017/0180276 A1* | 6/2017 | Gershony | H04L 51/222 |
| 2018/0367483 A1* | 12/2018 | Rodriguez | H04L 51/046 |
| 2021/0304741 A1* | 9/2021 | Cavallari | G06F 40/284 |

OTHER PUBLICATIONS

Sreelakshmi, K., et al. "Deep bi-directional lstm network for query intent detection." Procedia computer science 143 (2018): 939-946. (Year: 2018).*

* cited by examiner

*Primary Examiner* — Soe Hlaing
(74) *Attorney, Agent, or Firm* — Buckley, Maschoff & Talwalkar LLC

(57) ABSTRACT

Provided are systems and methods of a chatbot that can response on behalf of a first user during a three-way chat communication including multiple users and the chatbot. In one example, the method may include receiving a chat message transmitted from a first user device to a second user device, determining, via a machine learning model, an intent of the received chat message, detecting a suggested response based on the determined intent and external data, determining a confidence value for the suggested response based on a source of the suggested response, and outputting the suggested response when the confidence value is above a predetermined threshold via a chatbot of the chat application that is displayed within a user interface of the chat application on the second user device.

20 Claims, 10 Drawing Sheets

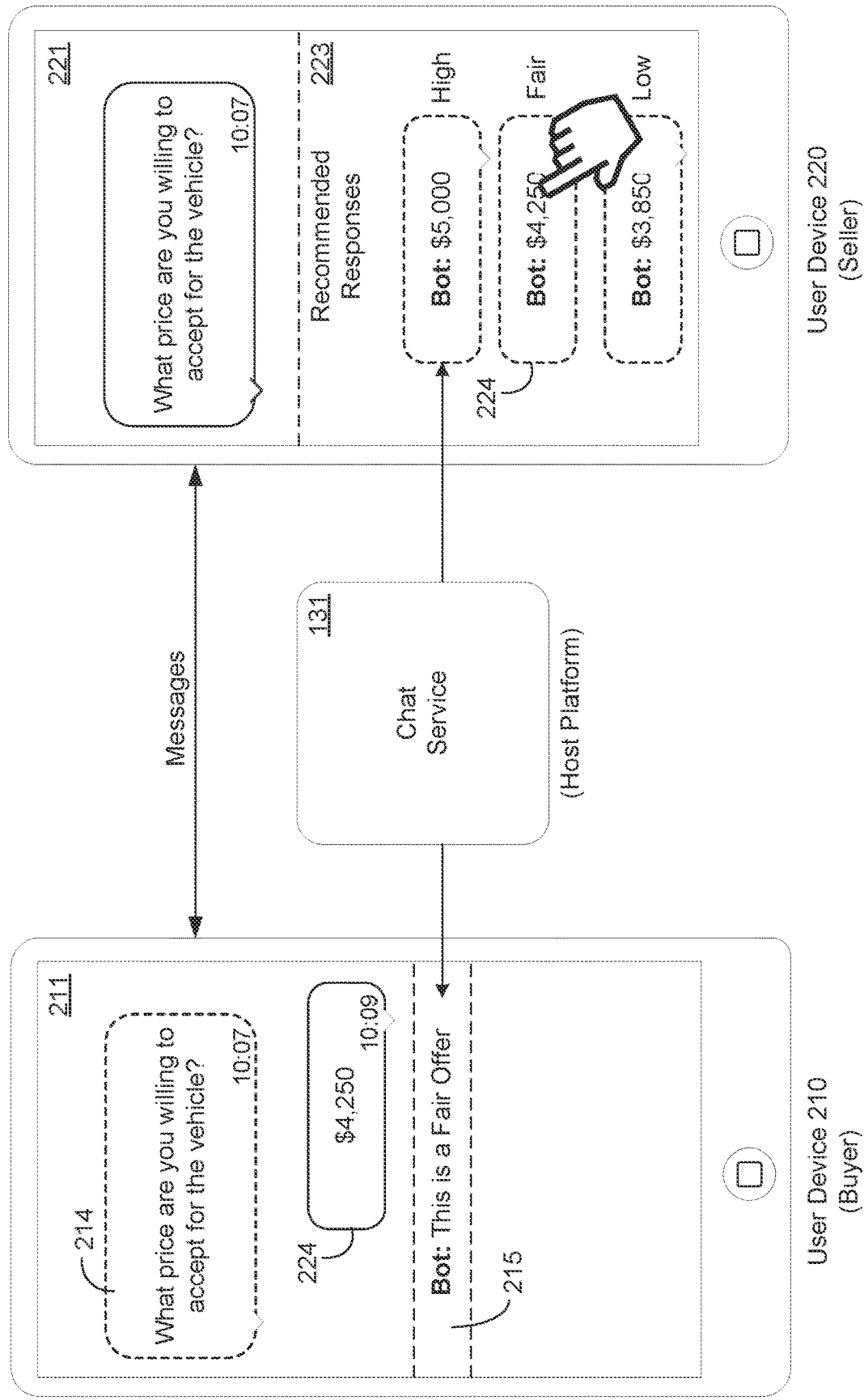

FIG. 3C

| Buyer Message | Smart Suggestions / Seller |
|---|---|
| Is it available? | ("Yes, it's available" Score = 87%), ("No, it's not" Score = 32%) ] |
| I would like to buy this for $15,000 | ("Sorry, that Offer is too low" Score = 77%), ("Accepted" Score = 72%), ("How about $18000" Score = 61%) |
| Your location? | 'share location' Score = 99% |
| Is this the final price? | ("Yes", Score = 47%), ("No, the price is negotiable", Score = 91%) |

350

352
354
356
358

FIG. 4
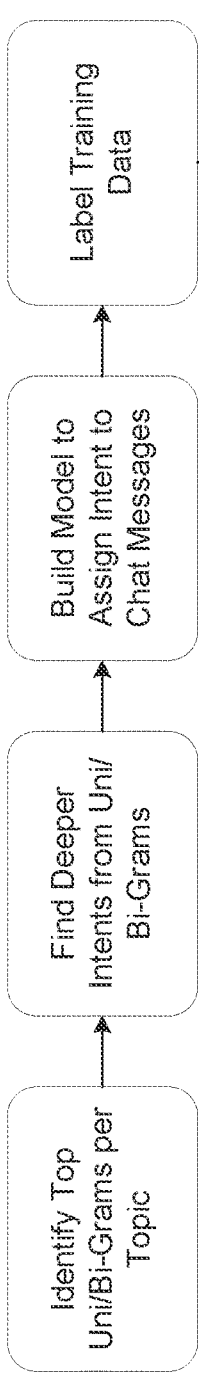
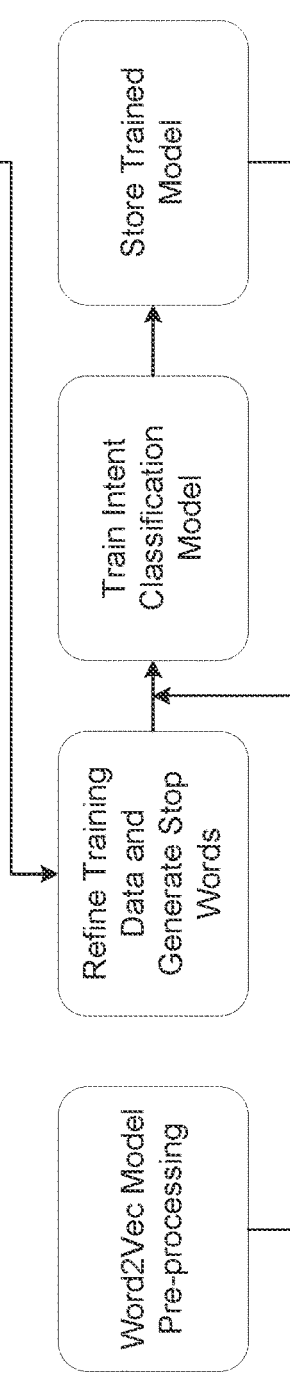
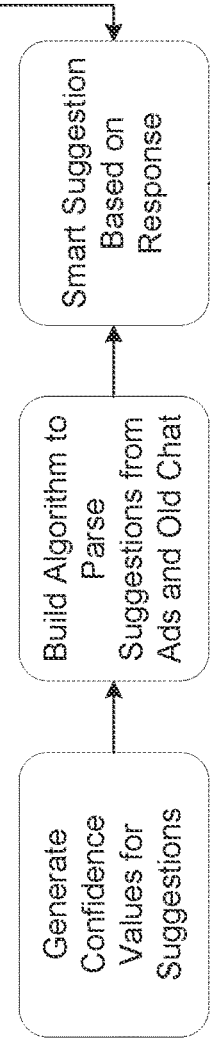
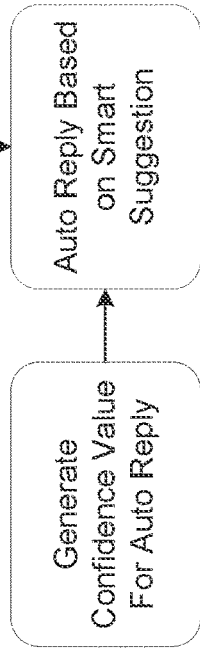
Step 1: Prepare Labelled Training Data
Step 2: Training Intent Model
Step 3: Generate Smart Suggestion
Step 4: Generate Auto Reply

INTERACTIVE CHATBOT FOR MULTI-WAY COMMUNICATION

CROSS-REFERENCE TO RELATED APPLICATION(S)

This application is a continuation-in-part of U.S. application Ser. No. 17/164,931, which was filed on Feb. 2, 2021, in the United States Patent and Trademark Office, the entire disclosure of which is hereby incorporated for all purposes.

BACKGROUND

An online marketplace enables buyers to purchase items from sellers through a website, a mobile application, a third party, or the like. Users may post ads and other users may respond with interest. For example, a potential buyer may reach out to a seller via text messages or the like. However, in many situations, the users lack experience and/or understanding that slows down the negotiation process. For example, a user may not be familiar with the other user(s) they are engaging with, an object (product) that is a subject of a purchase, types of questions to ask, a fair price for the object they are attempting to purchase, and the like. This lack of familiarity may cause a lack of trust and also cause a delay in coming to an agreement. Also, some users are not "serious" about making a purchase and are instead just curious. These type of users can bog down other users who are making a good faith attempt to negotiate an agreement.

BRIEF DESCRIPTION OF THE DRAWINGS

Features and advantages of the example embodiments, and the manner in which the same are accomplished, will become more readily apparent with reference to the following detailed description taken in conjunction with the accompanying drawings.

FIGS. 2A-2C are diagrams illustrating communication sequences between multiple users and a chatbot in accordance with example embodiments.

FIG. 3C is a diagram illustrating a process of generating smart responses during a live chat in accordance with an example embodiment.

FIG. 4 is a diagram illustrating a lifecycle of the intent classification model in accordance with example embodiments.

Figure 1:
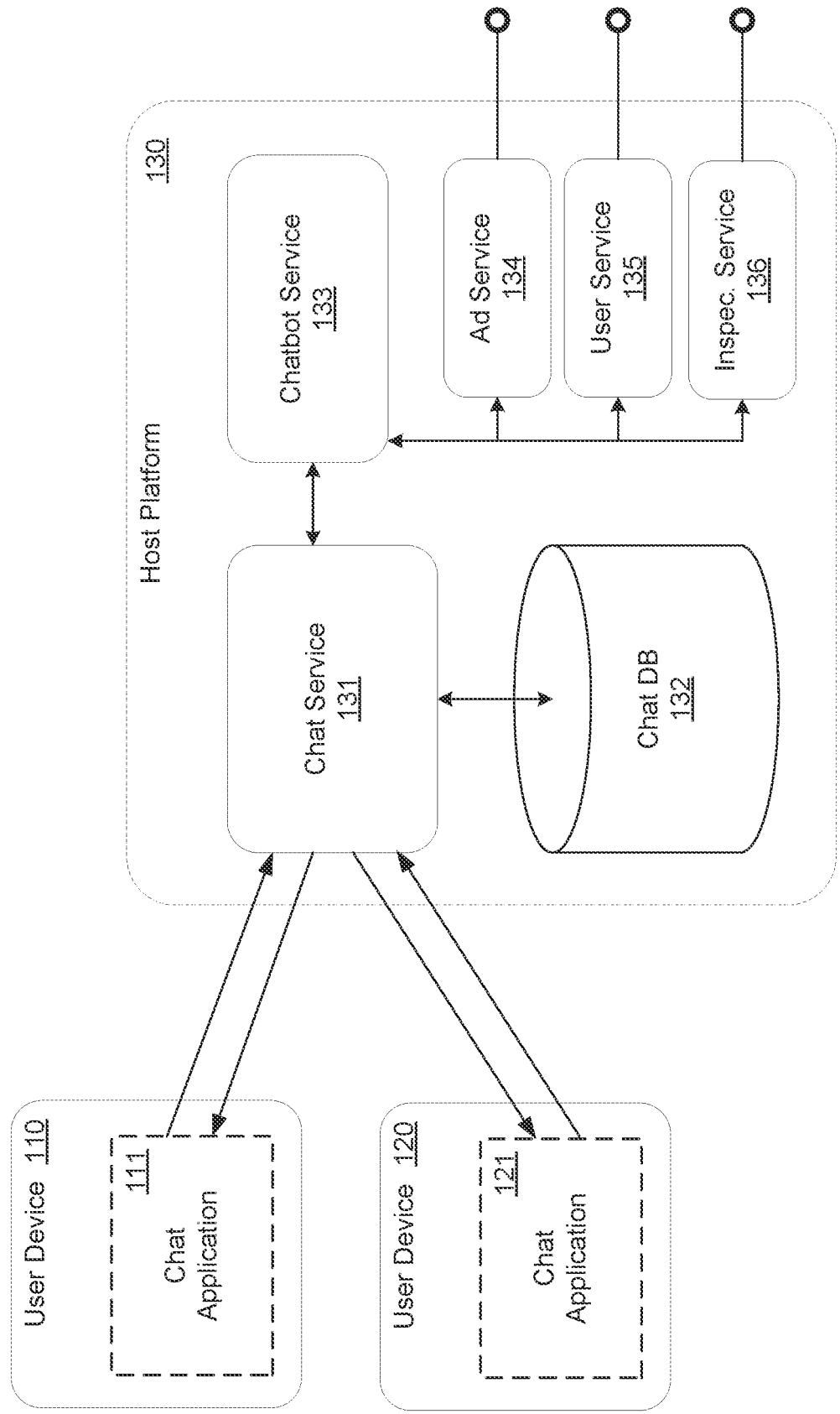
FIG. 1 is a diagram illustrating a host environment of a chat service with a chatbot making automatic smart suggestions in accordance with an example embodiment.

Throughout the drawings and the detailed description, unless otherwise described, the same drawing reference numerals will be understood to refer to the same elements, features, and structures. The relative size and depiction of these elements may be exaggerated or adjusted for clarity, illustration, and/or convenience.

DETAILED DESCRIPTION

In the following description, specific details are set forth in order to provide a thorough understanding of the various example embodiments. It should be appreciated that various modifications to the embodiments will be readily apparent to those skilled in the art, and the generic principles defined herein may be applied to other embodiments and applications without departing from the spirit and scope of the disclosure. Moreover, in the following description, numerous details are set forth for the purpose of explanation. However, one of ordinary skill in the art should understand that embodiments may be practiced without the use of these specific details. In other instances, well-known structures and processes are not shown or described in order not to obscure the description with unnecessary detail. Thus, the present disclosure is not intended to be limited to the embodiments that is shown but is to be accorded the widest scope consistent with the principles and features disclosed herein.

A chatbot (also referred to as a bot) is a software program that runs tasks (e.g., scripts) over the Internet. Typically, a chatbot performs tasks that are simple and repetitive. Some chatbots are capable of communicating via instant messaging. For example, a chatbot may communicate with a user via a back and forth exchange between the user and the chatbot. In this example, the chatbot may receive a message submitted by a user, match the request to a predetermined response, and output the matched response to the user. This type of chatbot interaction can be used to replace a human for simple data collection and information providing functions. However, chatbot interaction is usually between a single user and the chatbot. That is, the chatbot is typically restricted to a communication sequence with a single user device.

Recently, chatbots have become useful for providing automated responses during chat conversations. These existing chatbot solutions are limited to business-to-consumer (B2C) communications between a single user device and the chatbot. Here, the suggested response is rigidly selected from a predefined/strict set of responses that are previously built into the model and only cover a limited amount of peripheral aspects. That is, the chatbot only has access to a fixed known set of responses and the chatbot selects one from the fixed list. This is relatively successful for situations where the chat application is engaged with a single user and the amount of topics is very limited. However, if a user were to ask a question about a topic outside the scope of the fixed list, the model is unable to predict a response and generates an error or fails to respond. Furthermore, existing chatbot solutions are only able to handle one language at a time.

The example embodiments are directed to a chat service that can simultaneously communicate with multiple users involved within a single chat session. For example, the chatbot can interact (i.e., generate smart responses) for different users involved in the same chat conversation, rather than just a single user. The chat service may also include or otherwise communicate with a chatbot service that includes a machine learning model (or models) for identifying the intent of a user within a chat message, and generating a suggested or an automated reply to the chat message based on the intent derived by the machine learning model.

In contrast to the existing chatbot solutions mentioned above, in the example embodiments, the machine learning model is able to flexibly identify any topic (from among hundreds of possible topics) of communication between the different users and generate a response based on any of the possible topics. Rather than use a specific algorithm trained with predefined responses, the chat service uses an intent classification model to identify an "intent" of the chat message. That is, unlike existing chatbot solutions, the chatbot service described herein may ascertain user intent from free text rather than using fixed chat templates to provide automated chat responses. The chat service may implement or have access to deep learning, statistical, artificial intelligence (AI) and natural language processing (NLP) technologies for deep intent detection and handling multiple languages. With the intent identified, the chat service can then use external sources to find related response messages that are associated with the same intent. For example, the chat service may mine historical chat messages of the users, ads listing details of the product, and the like. In this case, the chat service may output a best possible response (or subset of response) with the highest confidence score from among the possible responses associated with an identified intent.

Within an ecommerce platform (e.g., website, mobile application, etc.), consumer sellers and buyers may struggle to communicate effectively with each other due to differences in literacy level, social or economic class, spoken language, interpersonal skills, and the like. Many conversations are not meaningful due to factors such as failure to understand a buyer's query, delayed or no response, inaccurate response, failure to update advertisement state, or the like. The cause of such misunderstanding may be due to incorrect spelling, grammars, lack of context and intent, or the like. Sometimes buyers ask the same repeated questions and information which is already displayed in a corresponding ad listing of the product. Also, a seller may not respond after his/her product gets sold but buyers are still repeatedly pinging the seller for negotiation, etc.

In some embodiments, the chatbot may be used to help negotiate the sale of an item between two users. For example, the chatbot can make suggestions that help facilitate the purchase/exchange of an item being sold via an e-commerce platform, or the like. The chatbot may interact with users within a chat window that may be part of a larger chat application (also referred to as a messaging application) that may be included in an online marketplace or other application. Examples of the types of messages that may be transmitted via the chat application include short message service (SMS), multimedia messaging service (MMS), and the like. As one example, the chatbot may interact with a buyer (or multiple buyers) and a seller during a negotiation of the purchase of an object via an online marketplace. However, it should be appreciated that the chatbot may be used in other types of applications, for example, call centers, help desks, social media platforms, and the like.

Some of the benefits of the chat service/chatbot described herein include the ability to learn how a user will respond in certain situations (e.g., in response to particular questions) and transmit a response on the user's behalf In the example of the online marketplace, a potential buyer may ask a seller a question about the object (e.g., product, etc.) being offered for sale by the seller. Here, the chatbot service may intercept/detect a message submitted from the first user device to the second user device and predict a response of the buyer. In this case, the chatbot may automatically output a response on the buyer's behalf. For example, the chatbot service may have integrated therein or otherwise communicate with one or more machine learning models that can learn from the conversations of users on the chat application. In some embodiments, the machine learning models can learn responses of users over time.

When generating the predicted response, the chatbot service may also determine a confidence of the predicted response. If the confidence value is high (e.g., above an upper threshold value), then the chatbot may automatically respond and output the predicted response via the message window which includes multiple users (or just one of the users). Here, the response may be identified as being generated by the chatbot (e.g., by a bot avatar, icon, text value, etc.). As another example, if the confidence value is less than the upper threshold, but above a lower threshold, the chatbot service may have a general idea of how to respond but may not be confident enough to automatically output the response in the chat window. In this case, the chatbot service may output the predicted response to only the buyer as a suggested response that must still be selected by the buyer. That is, the chatbot service may output the suggested response to only the buyer, not the seller, or vice versa. This enables the user to receive the suggested response and make a decision whether to user the predicted response or use a manual response. Meanwhile, if the chatbot service has little confidence in the predicted response (e.g., below the lower threshold value), the chatbot may not respond at all and allow the user to respond.

In some embodiments, the confidence value of a suggested response may be determined based on a source of the suggested response. For example, external sources of data (e.g., websites, databases, user accounts, social media, etc.) may be assigned different confidence scores in advance. When the system generates a suggested response based on content from one of these sources, the system may assign a confidence value to the suggested response based on the source of the content. As just an example, a suggested response pulled from an advertisement of the product may have more weight than a suggested response pulled from a chat session that occurred a month ago. Here, the confidence value may be based not only on the source but also the amount of time since the content was stored.

For example, the confidence scores may be assigned based on a relevance of the source of information from where the auto reply/suggestions are generated for the predicted intent. In this example, different levels of confidence scores may be assigned to different sources like 0.95 for seller's already answered questions to that intent, 0.85 for suggestions generated from ad parameters, 0.75 from ad description and 0.6 for default suggestions etc. The auto reply/suggestions values are dependent on the predicted intent but the score may be independent of the predicted intent and solely based on the source of information.

In some embodiments there may be two confidence values or scores where one is associated with the predicted intent (i.e., what is the confidence/probability of the predicted intent by Bi-LSTM model). Here, if that confidence is below a predefined threshold, it may be treated as if no intent was found and the system may not use or select any auto reply/suggestions. The second confidence value may be related to each auto reply/suggestions as described above.

In addition to a response, the chatbot service may also predict questions for the users to ask (e.g., the buyer or the seller, etc.). Furthermore, the chatbot service may output suggestions to the users to provide assurances. For example, the chatbot service may learn what is an average price based on other sales and conversations occurring within the chat application of the online marketplace. Here, the chatbot service may detect when a purchase offer has been submitted by a buyer and identify the purchase offer as good, bad, average, etc. The machine learning models used by the chatbot service may be generate automatic responses that are programmed to facilitate the closure of a deal between the buyer and the seller. That is, the chatbot service may help facilitate the closing of an agreement between a buyer and a seller. The machine learning models may be trained to provide answers and suggest responses that are directed towards the sale of an item.

In some embodiments, the chatbot service may simultaneously post responses inside the chat windows of all users participating in the conversation. As another example, the chatbot service may selectively post data, suggestions, etc., within the chat window of only one user or less than all users of the multi-way chat conversation. The chatbot service is also capable of identifying when a question has been asked, which triggers the chatbot service to generate and output the predicted response.

FIG. 1 illustrates a host environment 100 of a chat service 131 with a chatbot making automatic smart suggestions in accordance with an example embodiment. Referring to the example of FIG. 1, the chat service 131 may be hosted on a host platform 130 such as a web server, a cloud platform, a database, or the like. The chat service 131 may be part of a larger chat application that includes multiple services on the backend and a front-end client such as an instance of chat application 111 and an instance of chat application instance 121 running on user devices 110 and 120, respectively. Here, each of the user devices 110 and 120 may engage in communications with each other that pass through the host platform 130 (via the chat service 131). Each time a new message is transmitted, the chat service 131 may detect or otherwise intercept the new message and store the message in a chat database 132. In addition, the chat service 131 may call (e.g., an API call, etc.) a chatbot service 133 to generate a smart response to the new message. As further described herein, the chatbot service 133 may be equipped with or otherwise have access to a trained intent classification model (machine learning model) that can predict the intent of the new message.

The chat service 131 of the host platform 130 may output and manage a chat window within the instances of the chat application 111 and 121 which may be used by a first user (the user device 110) and a second user (the user device 120) to communicate with each other via messages, for example, text messages, instant messages, short-message-service (SMS) messages, multimedia messaging service (MMS) messages, and the like. Here, the chat application may be a mobile application which include a back-end chat service 131 hosted by the host platform 130 and a front end chat client (instances of the chat application 111 and 121) installed on the user devices 110 and 120, respectively. As another example, the chat application may be a web application. The user devices 110 and 120 may communicate with the host platform 130 via the Internet, a private network, or the like.

In the example of FIG. 1, the chat service 131 may call a chatbot service 133 that can generate automated responses and simultaneously interact with multiple users at the same time within a single message window. In this example, the chatbot service 133 has an intent classification model integrated therein (e.g., installed therein) capable of identifying intents from chat messages. The intent classification model may be trained based on historical chat messages/intents of all users, specific users, or the like. In some embodiments, the machine learning models may be trained based on chat conversations of different users than the users of user devices 110 and 120.

According to various embodiments, the user devices 110 and 120 may exchange messages via a message window (not shown) of the instances of the chat application 111 and 121. In addition to icons representing users, the instances of the chat application 111 and 121 may also display (e.g., via a message window, etc.) an icon or an avatar of a chatbot output by the chat service 131 that participates in the messaging conversation via the message window. In this example, a user of the user device 110 may submit or otherwise input a message directed to a user of the second device 120. For example, the message may be associated with an object being sold. In response, the chat service 131 may detect the message input from the user device 110 and call the chatbot service 133 to generate an automated reply. The call may include an application programming interface (API) call, or the like. Here, the chat service 131 may pass variables (e.g., text content from the submitted chat message) to the chatbot service 133.

In response, the chatbot service 133 may determine an intent of the message and then identify possible replies based on the detected intent. For example, the chatbot service 133 may identify possible responses by calling one or more additional services such as an ad service 134, a user service 135, an inspection service, or the like. The ad service 134 may receive the intent from the chatbot service 133 and then search for related content, answers, comments, etc., within an ad/web listing of the object that is the subject of the purchase between the user devices 110 and 120. The user service 135 may receive the intent from the chatbot service 133 and search for related content, answers, comments, etc. within historical chat sessions between the users and each other or other users. In an example in which the item for sale is a vehicle, the inspection service 136 may receive the intent from the chatbot service 133 and search for related content, answers, comments, within vehicle inspection reports stored in external databases, etc.

In addition to finding possible answers/message replies, the chat service 133 may also generate a confidence score of each of the possible replies. For example, the confidence score may be generated by a machine learning model of the chat service 133. Here, the confidence score may be based on the source of the answer, or the like. The chatbot service 133 may be implemented with multiple machine learning models capable of further analyzing the intent and performing deep learning on the intent to further classify the intent into a sub-topic (sub intent).

While a user's question may be related to the topic of vehicle tax, there could be dozens of possible sub-topics about vehicle tax. Therefore, the chat service 133 may further refine the intent with a related sub-topic (e.g., when is the next vehicle tax payment due, etc.). By further refining the identified intent into a sub-intent, the chat service 133 can then identify more accurate/relevant responses to the message. As an example, a first machine learning model may predict whether a question is present in the message, and a second machine learning model may predict a response to the question. In this example, the first machine learning model may trigger the second machine learning model to predict a response to the question. Here, the machine learning models may work as a chain of models in which an output from a first machine learning model of the chat service 133 triggers execution of a second machine learning model of the chat service 133.

The chat service 131 may receive the predicted response/ reply from the chatbot service 133 and the confidence value and determine whether or not to output the predicted response on behalf of one of the user devices 110 and 120. For example, the chat service 131 may store an upper threshold value and a lower threshold value. If the confidence value of the response received from the chat service 133 is greater than the upper threshold value, the chat service 131 may output the predicted response via a chatbot displayed within the message window of the instance of the chat application 111 and/or the instance of the chat application 121. As another example, if the confidence value is less than the upper threshold but greater than the lower threshold, the chat service 131 may output a suggestion to an instance of the message window displayed on only one of the user devices (e.g., user device 120), but not the other user device (e.g., user device 110). In other words, the chat service 131 may output a suggestion including the predicted response (or a predetermined number of predicted responses) to the instance of the message window within the instance of the chat application 121 on the user device 120, while preventing or otherwise hiding the suggested responses from an instance of the message window within the instance of the chat application 111 on the user device 110. As another example, if the confidence value is below the lower threshold, the chat service 131 may refrain from outputting anything and leave it for the user to manually respond.

It should be appreciated that different types of objects (e.g., vehicles, personal property, tickets, clothing, sporting equipment, electronics, etc.) may have different intents and different intent classification models. In one example, the object may be a vehicle. Here, the intent classification model may be trained to identify potential intents of a buyer and a seller engaged in the negotiation for the sale of a vehicle. The intent classification model may be trained on historical chat data between users engaged in the sale of vehicles. The chat data was analyzed in view of different dimensions such as the topics in the chat conversation, frequency distribution of these topics, frequency distribution of number of topics in a conversation, seller responsiveness on different topics, topic distribution and redundancy on an ad, etc. The analysis identifies factors to be addressed to ease user experience and resolve pain points in the classified business of selling vehicles such as buyers not inquiring about vehicle details, repetitive messages from buyers, non-responsiveness from a seller, and the like.

For example, when a buyer (one of the user devices) directly jumps to negotiation or contact request without having enough information about the product, the chat service described herein may provide a list of potential questions (question cloud) with suggested questions for the buyer to ask of the seller. These questions may be mined by chat data analysis of buyers to get the set of relevant questions in the cars category along with the right sequence in which they are to be asked. As another example, when multiple buyers ask the same questions about the product, user, etc., to the seller, the seller must repeatedly respond to the same question to every buyer which requires more effort in typing the same thing to the individual buyers. To resolve this problem, smart suggestions may be generated and shown to the seller as suggested responses to buyer messages based on the intent of the buyer messages. These suggestions are generated through various sources (as explained later on) of information available to make them more contextual. As another example, sellers may not respond to buyer messages or respond late. This can cause a bad buyer experience. To resolve this problem, auto replies may be generated and output without the need for approval from the seller.

Figure 2A:
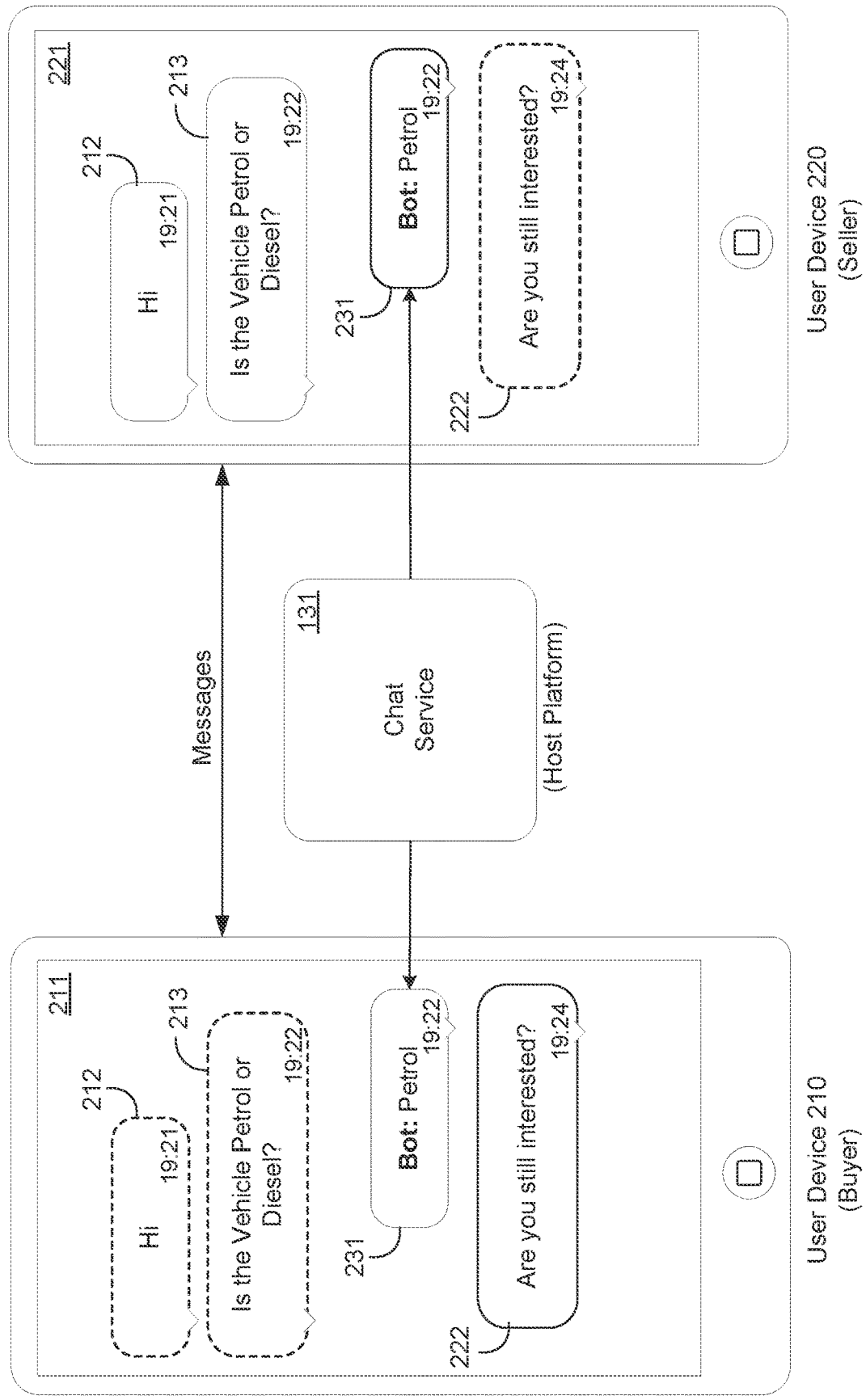
Figure 2C:
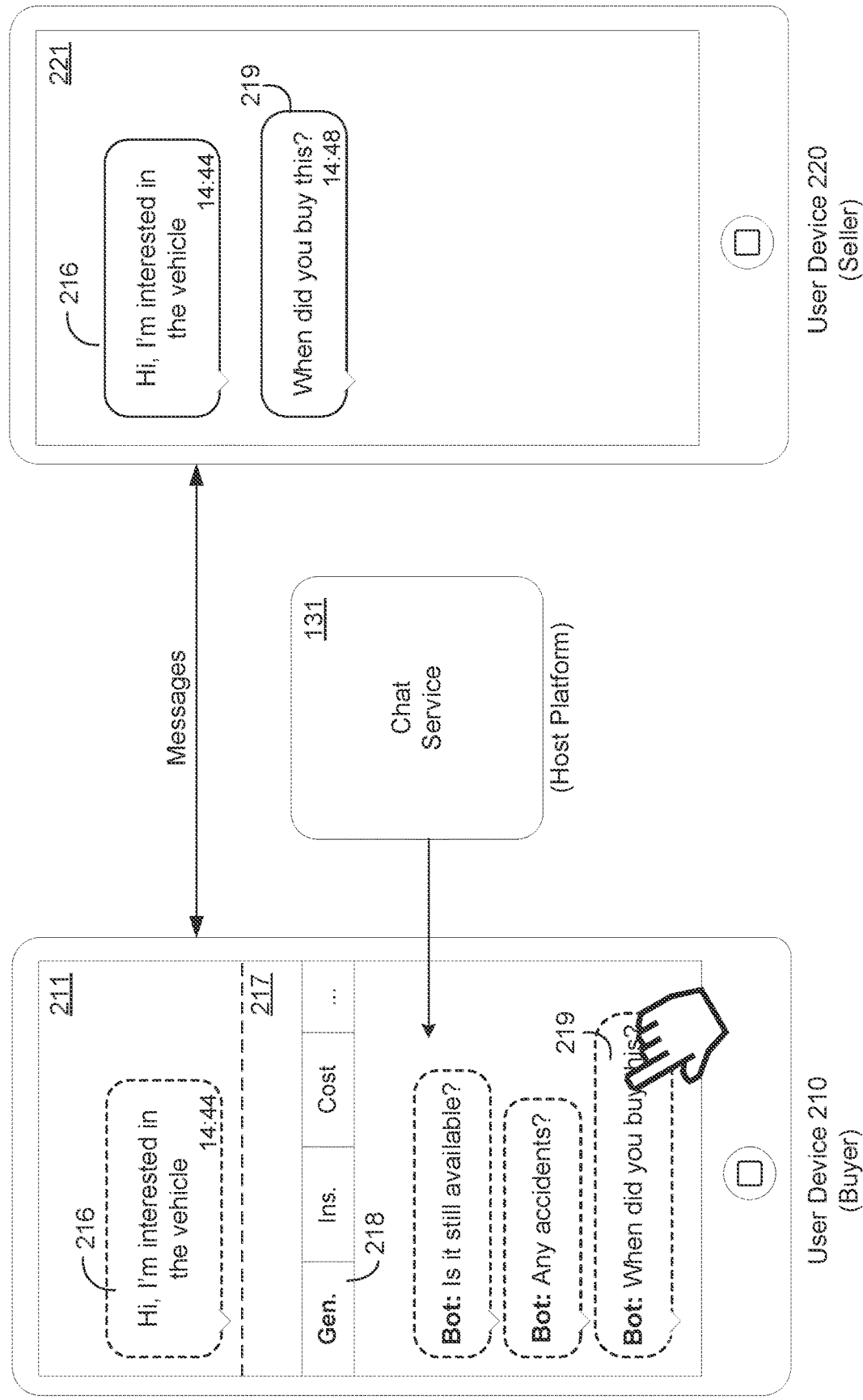

FIGS. 2A-2C illustrate communication sequences between multiple users and a chatbot in accordance with example embodiments. In addition to predicting a response, the chatbot service 133 may also predict a confidence value associated with the predicted response and provide both to the chat service 131. In some embodiments, the confidence value may represent the confidence of an intent predicted by the intent classification model 300 described below with respect to FIG. 3A. The confidence value may be used to determine whether to automatically output the predicted response on behalf of a user, whether to suggest the response to one of the users, or whether to ignore the predicted response and allow the user to manually answer.

Referring to FIG. 2A, a process 200A of an automated chatbot response is shown. In the example of FIG. 2A, two users (via user devices 210 and 220) are communicating via the chat service 131. Here, a first user inputs/submits messages 212 and 213 via a message window 211 on a user device 210. The messages may include unstructured text, alphanumeric content, and the like. The messages 212 and 213 are delivered to a message window 221 of a user device 220 of the second user via the chat service 131. As the messages pass through the chat service 131, the chat service 131 may detect the existence of the messages and identify whether the messages include a question, for example, using one or more machine learning models. In this example, the chat service 131 does not detect a question in message 212, however, the chat service 131 does identify a question within the unstructured text content of message 213.

Figure 3A:
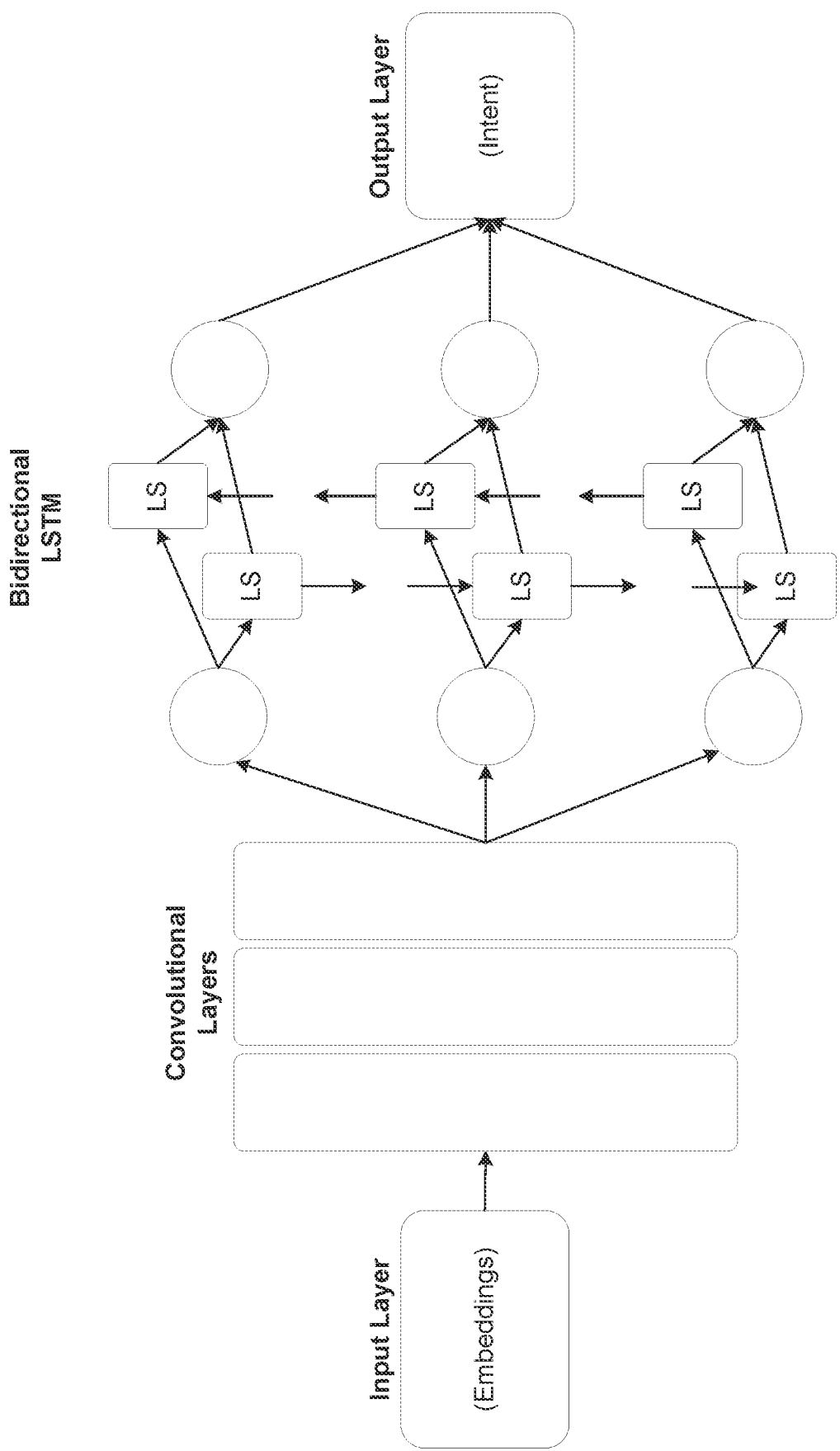
FIG. 3A is a diagram illustrating an intent classification model for determining an intent of a user within a chat message in accordance with an example embodiment.

In response to detecting the question, the chat service 131 may trigger the chatbot service 133 shown in FIG. 1 that includes the intent classification model (e.g., such as shown in FIG. 3A) to predict a response to the question. In this case, the chatbot service 133 predicts a response with great confidence. Accordingly, the chat service 131 with the chat service 131 may automatically output the predicted response in the form of a message 231 which is displayed on both message windows 211 and 221 of user devices 210 and 220, respectively. Thus, the chatbot is able to interact with the first user on behalf of the second user and step into the shoes of the second user.

The chat service 131 may output the response message 231 in near real-time thus providing the users with immediate responses and preventing the user of the user device 220 from needing to respond. In this example, the user of user device 220 also posts an additional message 222 which the chat service 131 detects, but is not confident in the answer. Therefore, the chat service 131 does not respond and waits for the user of user device 210 to respond.

Referring to FIG. 2B, a process 200B of the chat service 131 providing a recommend response to a user of user device 220 is shown. In this example, the first user enters a question 214 via the message window 211 which is detected by the chat service 131. Here, the chat service 131 identifies a top number (e.g., top 3, etc.) of predicted responses and outputs the recommended responses onto an area 223 of the message window 221 of the user device 220, but not on the message window 211 of the user device 210. That is, the chat service 131 may only output the recommended responses to an instance of the message window 221 of the user who is to select the recommended response. In this case, the recommended responses are predicted by the machine learning model, but the machine learning model lacks confidence about the responses. For example, the confidence value of the recommended responses may each be below an upper threshold value, but above a lower threshold value.

The chat service 131 may also output context associated with the recommended response (e.g., high, fair, low, etc.) to the area 223 of the message window 221. The context may be additional details of the proposed responses such as a fairness of the proposed offer with respect to similar objects that have been purchased through the chat service 131, or the like.

In this example, the user selects the recommended response 224 and the chat service 131 delivers the recommended response 224 as a message of the second user to the first user via the message window 211 of the user device 210. Although not shown in FIG. 2B, the chat application may close the recommended response area 223 and display the recommended response 224 on the message window 221 of the user device 220 to match the display on the message window 211 of the user device 210. In addition, the chat service 131 may also provide information about the recommended response 224 to the first user via the message window 211. Here, the chat service 131 provides context 215 that identifies the proposed sale price as a fair price.

As another example, if the machine learning model is unable to arrive at a confidence value above a lower threshold, the chat service 131 may not output a predicted response as any of an automated response or a recommended response. Instead, the chat service 131 may wait for the user to respond manually.

Referring to FIG. 2C, a process 200C of the chat service 131 providing recommend questions to a user of user device 210 is shown. Here, the user of the user device 210 posts an initial message 216 indicating interest in an object (vehicle) being offered for sale by a user of the user device 220. The chat service 131 may execute the one or more machine learning models to predict questions that are available in this situation. Here, the recommended questions are output by the chat service 131 on an area of the message window 211 of the user device 210, but not the user device 220. Instead, the chat service 131 hides the recommended questions from the second user device.

The questions may be arranged by categories. In this example, recommended questions are from a category 218 (general questions) which may be shown by default. The user may select other categories and receive a list of the top most questions for that category. The categories and the questions will be different depending on the object that is for sale. For example, recommended questions for a vehicle (e.g., any accidents, etc.) may be different from recommended questions for a mobile phone (e.g., what is the operating system, etc.) The questions and the categories may be dynamically selected by the bot software based on predictions by the machine learning model based on the current conversation content, the user, the object, and the like.

In this example, the user selects question 219 via the area 217 of the message window 211, and the chat service 131 delivers the selected question 219 to the message window 221 of the user device 220. In this example, the chat service 131 may recommend questions to a user that a user may be unaware of or that may help the user obtain valuable information about the object being offered for sale. These questions may be predicted by the machine learning model based on questions asked by other users of the same object.

In some embodiments, either the buyer or the seller may deactivate or otherwise turn off the smart response/suggested response feature of the chat application by selecting an option to disable smart responses within the user interface. In doing so, the buyer or the seller will no longer receive suggested responses or have the chat bot automatically reply on their behalf.

FIG. 3A illustrates an intent classification model 300 for determining an intent of a user within a chat message in accordance with an example embodiment. For example, the intent classification model 300 may include a bidirectional long short-term memory (LSTM) architecture. The intent classification model 300 may receive a message from the chat service and determine an intent of the message. The intent may refer to the intent of the user who sent the message.

As an example, two users may be engaged in the negotiation for the sale of a vehicle. In this example, a potential buyer may send the seller a question about the price of the vehicle being offered for sale. In this case, the intent classification model 300 may detect that the intent of the message is "price". Each intent may be linked to a plurality of possible responses. The more narrowed the intents, the more accurate the suggested responses. For example, the "price" of the vehicle may refer to various prices such as a dealer-quoted price, a final price, whether the price is negotiable, etc. Therefore, the intent of price can be further divided into more refined intents such as dealer-quoted price, final sale price, about-price-negotiable, and the like. In the example of the vehicle, the number of intents may be more than 100.

Referring to FIG. 3A, the intent classification model 300 may be developed using the Bi-LSTM architecture with convolution layers. The Bi-LSTM is a recurrent sequence classification model and adding convolution layers adds the capability to identify spatial features in the sequence (n-gram features). Here, the intent classification model 300 may receive a chat message as input and output an intent from among a plurality of possible intents. For example, the intent classification model 300 may classify a buyer message into one of many different intents (classes). These intents may be generated by performing frequency distribution analysis on buyer chat data using n-grams (unigrams, bigrams).

Word embeddings may initially be added by default to the input layer of the Bi-LSTM architecture. Here, the initial word embeddings may representing words that are closely related to various intents which can be used to mine the intent from a message. As the intent classification model is trained, the word embeddings may continue to grow and expand based on the training. For example, the default set of initial word embeddings may continuously grow and evolve to include additional word embeddings that are mapped to intents. These word embeddings are related keywords with respect to intents.

The training of the Bi-LSTM architecture may be performed using historical chat session data. The historical chat session data may include previous chat data between the same buyer and seller. As another example, the historical chat session data may include previous chat data between one of the buyer and the seller and a different user. As another example, the historical chat session data may include previous chat data between other users (i.e., buyers and sellers) that are not the subject of the current chat session. The historical chat session data may include messages which are tagged with intents which train the Bi-LSTM architecture. The messages may be preprocessed to remove stop words, correct misspelled words and replace some patterns like buyer offer price, phone numbers, emails, mileage, numerals, year of car registration with placeholders values. In some embodiments, the historical data to train LSTM architecture is at buyer message level which can be from any chat conversation. The training data may contain the buyer message and their associated target intent irrespective of any conversation.

In the example of FIG. 3A, the Bi-LSTM architecture of the intent classification model 300 includes an input layer, convolutional layers, a maxpooling layer (not shown) within or adjacent (e.g., right after) the convolutional layers, a bidirectional LSTM, and an output layer. The Bi-LSTM architecture may be trained to assign an intent from among a list of possible intents to a chat message and also determine a confidence score of the intent.

Figure 3B:
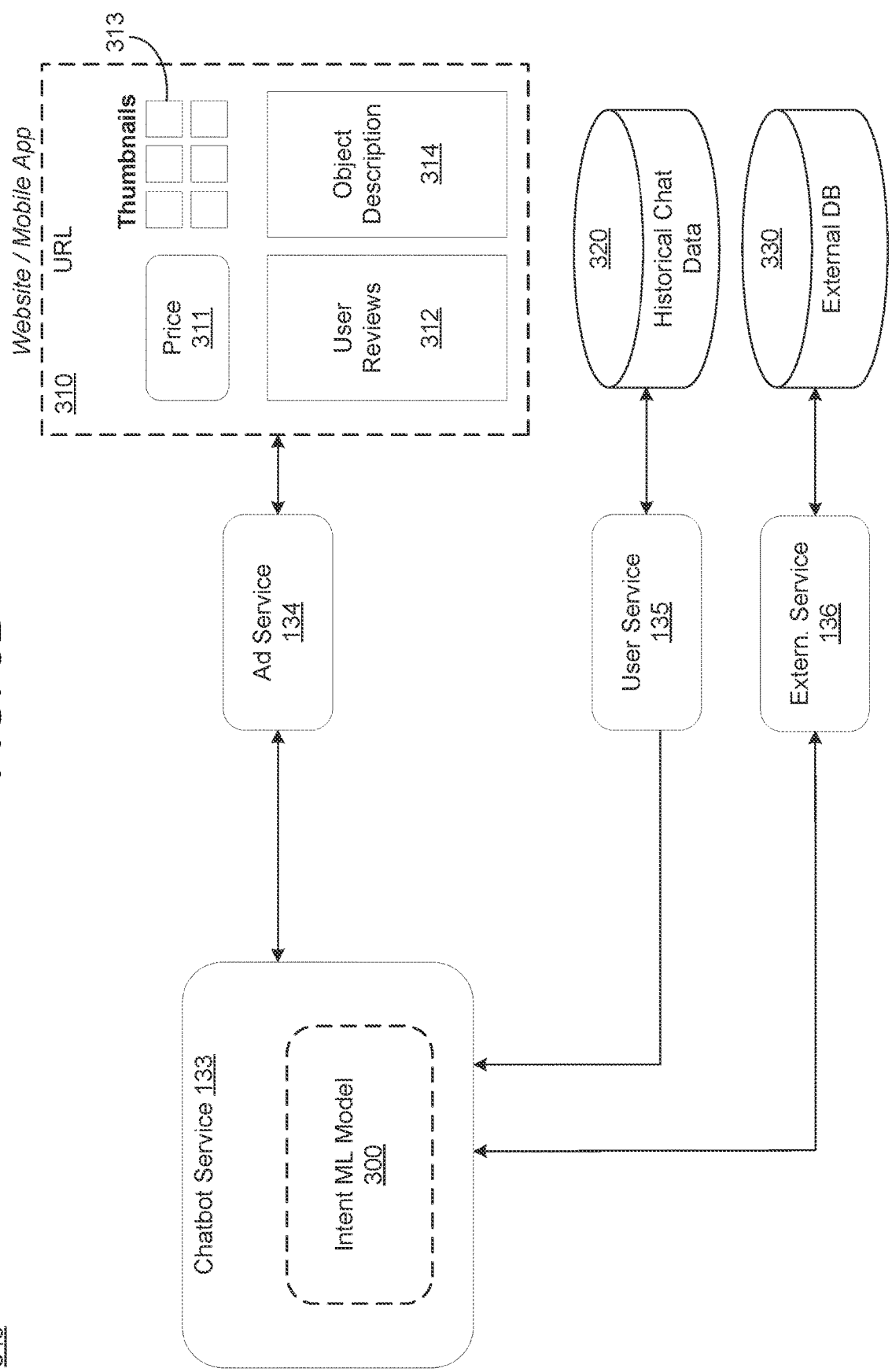
FIG. 3B is a diagram illustrating a process of generating smart responses based on determined intent in accordance with an example embodiment.

FIG. 3B illustrates a process 340 of generating smart responses based on determined intent in accordance with an example embodiment. In the example embodiments, a "smart response" may include an automated reply that is sent directly by the chatbot without any user intervention based on the predicted reply of a first user in response to a message submitted by another user (i.e., a second user). As another example, the smart response may include at least one "suggested" response, or a group of "suggested" responses (e.g., a top 5, etc.), which are not automatically sent by the chatbot to the second user, but are instead shown as a suggestion to the first user via a user interface on the first user device, and the first user is given a chance to select a suggested response from among the group of suggested response (or ignore the suggested responses altogether).

The chat service 131 may determine whether to automatically reply to the chat message submitted by the second user (on behalf of the first user) or instead to show some suggested responses to the first user based on a confidence score of the predicted responses. For example, if the top predicted responses has a high enough confidence rating (e.g., over 90% confidence) the chat service 131 may automatically send the smart response on behalf of the first user to the second user. Here, the response may be output by the chatbot icon on the screen of the messaging window of the chat application so that the second user is aware that this is an automated response. As another example, if the top predicted response is less than 90% confidence but greater than 60% confidence, the chat service 131 may display the top predicted response (or multiple responses, if multiple responses are above the 60% threshold) as suggested possible responses to the first user and allow the user to make a selection. Here, the first user may easily select a response from the list and it will be sent to the second user. As another example, the first user may bypass the suggested responses and submit their own response. If the confidence value is less than the lower threshold (e.g., less than 60%), the chat service may determine not to respond or make a suggestion on the response because the intent of the message cannot be identified accurately. In some embodiments, it may be possible for the user to dynamically adjust the desired confidence threshold for automatic replies versus smart suggestions. Here, a user can dynamically change a threshold value via an option within the user interface to change the predefined threshold to move it up (greater in value) or down (lower in value) thereby requiring greater confidence or less confidence in determining to respond, respectively.

Referring to FIG. 3B, the trained intent classification model 300 may be installed and executed by the host platform. For example, the trained intent classification model 300 may be embedded within or accessible to the chatbot service 133 shown in FIG. 1. Here, the chatbot service 133 may receive a message from the chat service 131 and generate a smart response which is returned to the chat service 131 along with a confidence score. The chatbot service 133 may use the intent classification model 300 to predict an intent of the user within the message. Furthermore, the chatbot service 133 may store a mapping of reply messages to intents within a file. In this case, when an intent of the sender is found, the chatbot service 133 can map the intent to a small set of reply messages for the receiver to send to the sender.

The reply message content may be developed using content from a website 310 that includes a web listing that advertises the product being negotiated. As another example, the reply message content may be generated using historical user data of previous chats stored in a user database 320. As another example, the reply message content may come from external data sources such as inspection records or the like stored in an external database 330. Here, various services 134, 135, and 136 may be called by the chatbot service 133 to provide reply content by submitting an identifier of the intent predicted by the intent classification model 300 to the services 134, 135, and 136. Here, the services 134, 135, and 136 may use a sliding window such that only recent content is extracted and analyzed for response content. The sliding window may have a start time that is within a predetermined threshold of time from a current time (e.g., one month, 3 months, etc.)

As an example, the ad service 134 may be called by the chatbot service 133 (e.g., via an API) to identify attributes of the object that is being negotiated between the buyer and the seller from the website 310 which may include a web listing/advertisement. Here, the ad service 134 may extract data from any of a price value 311, user review messages 312 that have been posted to the web listing, images (thumbnails 313), a product or object description 314, and the like. Here, the website 310 may be part of the ecommerce platform where the object is being negotiated for sale. As another example, the user service 135 may be called by the chatbot service 133 to identify previous response messages posted by either of the users (buyer or seller) from a database 320 of historical chat data. As another example, an external service 136 may be called to retrieve data from an external endpoint such as an inspection database (vehicle inspections), a certificate database, an emissions database, and the like, which may have additional data associated with the object (such as a vehicle). The data that is retrieved by the services 134, 135, and 136 may be used by the chatbot service 133 to train the intent classification model 300 to identify patterns between input messages (e.g., submitted by the buyer) and response messages (e.g., submitted by the seller). Furthermore, the intent classification model 300, once trained, may be used by the chatbot service 133 to predict response messages based on the identified patterns.

As a non-limiting example, the input data to the Bi-LSTM architecture of the intent classification model 300 may be a buyer generated message with a fixed length of eight words after padding or truncating the actual buyer message. For example, the message length of eight words may be derived by analyzing a frequency distribution of the number of words in the message. To generate smart suggestions, whenever a user sends a message in chat conversation the message is preprocessed to remove stop-words, punctuations and replace patterns with placeholders and sent to the intent classification model 300 to predict intent. A master configuration mapping may be prepared and stored within the chatbot service 133 which contains all the intents and their associated custom configuration that define the behavior and operations for an intent. This configuration specifies how to generate smart suggestions for an intent from various sources, whether this is a default suggestion type of intent, whether the intent is eligible for auto reply, etc. This configuration can be easily modified to add a new intent or update the behavior and/or handling of any existing intent.

Meanwhile, the reply content (e.g., smart suggestions, etc.) may include answers derived from the identified intent of the question from various sources, such as ad parameters, title, description from the posted ad or from an inspection report by the professional who inspected the product in person. The suggestions are parsed from these sources and given confidence scores based on the data source. Default suggestions may also be added to the smart suggestions list with a lower confidence score. The final suggestion is sorted with the confidence scores in descending order and a top subset (e.g., top 3, 5, etc.) of suggestions may be displayed to the user.

FIG. 3C illustrates a process 350 of the host platform predicting responses and confidence values of the responses based on the intent classification model during a live chat session between a first user (e.g., a buyer) and a second user (e.g., a seller). In this example, the chat service 131 has a top threshold value of 85% and a lower threshold value of 60%. When only one predicted response has a confidence value over 85%, the predicted response can be output as an automatic reply by the chatbot on behalf of the seller. If, however, there are one or more predicted responses with a confidence value less than 85% but greater than or equal to 60%, the one or more predicted responses may be output to only the seller as suggested responses capable of being chosen by the seller, but not yet sent to the buyer.

In this example, the chat service predicts two possible smart responses 354 in response to a buyer message 352. Here, the two possible responses 354 include a score of 87% and 32%, respectively. Since only one of the predicted responses has a confidence value over 85%, that response is output as an automated reply. Meanwhile, the chat service provides three possible responses 358 in response to a message 356. Here, the three possible responses all have confidence values between 60-85%. Thus, all three are output as suggested responses to only the seller's user interface (i.e., the instance of the chat application on the seller's device, but not on the instance of the chat application on the buyer's device). The seller is given a choice to select one of the responses or to bypass them entirely and submit their own response.

The model described herein may use certain NLP and computational linguistics techniques (dependency parse trees, coreference, anaphora, WSD, WSI to name some of them) in a deep intent detection framework. This may help scale up the coverage/accuracy significantly (e.g., by around 40 to 50% at a pan India/Indonesia scale) compared to using standard statistical and Bayesian techniques (e.g., co-occurrence matrices, tf-idf, Markovian, etc.) used industry wide for these tasks.

Furthermore, the model can be adapted in a quick and scalable way for building chatbots for any language/mix of languages across the globe for different verticals (autos, classifieds) and different transaction segments (C2B, C2B2C etc.). Also, there is a huge technical challenge that is solved by the model (compared to ASPA/NER), since the model is dealing with many specific intent classes (e.g., 120 specific intents, etc.) to just 2 generic classes (positive/negative) in sentiment analysis or a handful of generic classes in NER (name, place, organization etc). To add to it, another technical challenge here, is that in sentiment analysis/NER, the model has complete prior knowledge of the target classes (positive/negative or name/place/org) but here the model is using state of the art and robust NLP techniques to discover over 120 unknown/hidden/latent deeper intents (e.g., tax time, tax amount, tax validity) of which there is no know prior knowledge about (it being data driven) with high coverage, accuracy and objectivity.

In some embodiments, the model may be trained for one particular business domain or many different domains. As an example, the model may be trained specifically for automobiles. By reducing the scope, the model can be trained to identify more contextually relevant intents in a more fine-grained manner. This is done through a process where the model mines over 120 contextually relevant and specific intents (to motors) to which most of the buyer messages can be tagged to (with high coverage). The way it improves the efficiency of the chatbot is that the model, via the chatbot, can then recommend contextually very specific and relevant responses thereby leading to higher adoption among users and also help us enable a novel feature (auto chat) due to being confident about the relevance of the response.

From an accuracy standpoint, using encoders and transformers could have been a possible solution. However, transformers are expensive to train (need more data and take more time in inference) and are also slower in production (for a system like this one needs fast response as the user might start typing if there is a slight delay in recommendations thereby defeating the whole purpose of smart suggestion).

A relatively high validation accuracy may be obtained using the Bi-LSTM architecture itself (possibly because there is shorter sentences) and hence transformers might not give a very high efficiency/accuracy gain coupled with the fact that Bi-LSTMs also take into aspect both directions of the sequence (and hence bidirectional) while predicting output on a given LSTM cell. Bi-LSTM helps achieve an optimum between accuracy (efficiency), response time (inference speed), cost to train (time, memory and data needed) and training the model using custom in house training data (prepared from scratch) (unlike pretrained models) thereby leading to precise domain adaptability. Hence, compared to transformers, the model may trade off a possible slight efficiency gain from transformers (self-attention) with other advantages that come from the Bi-LSTM model.

Another benefit of the model described herein is the ability to work in multiple languages. The model may be trained on historical chat data and word embeddings from the model may be used to process the words in the buyer queries for training and inferencing by the Bi-LSTM model. The benefit of using the word embeddings rather than actual words is that, the words that are semantically similar (synonyms, belonging to different languages) and syntactically similar (misspelled) would have closer vector representation (word embedding) due to the context in which they appear and hence can be treated identical by the model. This is due to the fact that chat data contains short sentences with mostly domain specific words (e.g., tax, engine, model, etc.) along with generic words that can be of different languages (e.g., kitna, amount, etc), so the domain specific words are acting as a key or bridge to map similar words to close representations.

Furthermore, the system may not have labelled data upfront. Therefore, the training can rely on a combination of computational linguistic techniques (dependency parse trees, anaphora, coreference) to discover these bigrams. The way this combination helps is that syntactic (grammatical) structures in the data can be built through dependency parse and then tokens/expressions related to a broad intent can be discovered. Once the model mines the entities of interest as described above (validity, time, amount) corresponding to the broad intent (tax here) the model may try to find a syntactic pattern (from our dep. parse). The model may then try to discover tokens in the unknown language by mining words in the message that have the same syntactic structure/relationship with this broad intent (tax) as to the previously discovered words in the known language. This process is iterated until the model does not discover any new tokens based on the previously found tokens. This gives an exhaustive list of bigrams (skip or continuous) for this intent. With these deep intents, the chatbot can provide accurate and contextually relevant smart suggestions.

As a result, the model can easily be extended to handle any number of languages by making use of the above mentioned computational linguistic techniques. Now, how training data is generated with this is that messages containing bigram(s) from a particular intent are tagged with that particular intent. As obvious, a message can be tagged with multiple intent(s). For example, a person is both negotiating on price (price-negotiation) and asking about tax in the same message. In case of multiple intents in a message (say tax and price-negotiation), the model may use sentence sense disambiguation (adaptation/extension of WSD) and salience detection to disambiguate among these intents and find the most relevant one. The Bi-LSTM scope kicks in when it is fed the training data as generated above. This is standard text classification in a many inputs (each token in a message) to one output (intent) setting. The embeddings may be initialized here with the word2vec embeddings (from the data), thus the scope is enhanced.

Hence, from a user perspective, the user is receiving a very precise and contextually relevant response. So, if different choices were made then the responses would not be contextually precise (for the autos domain) from a user adoption view point. Auto chat (replying automatically on behalf of a user with a chatbot) is another distinguishing user interface feature not present in the art. From a technical standpoint, it is due to the deep intents that the model uses which give high confidence in being able to do such auto chat on behalf of a human. Again, the technical choices in discovering these deep intents from unstructured data has been described above.

FIG. 4 illustrates a lifecycle 400 of the intent classification model 300 in accordance with example embodiments. Referring to FIG. 4, during a first step, training data for the intent classification model 300 is prepared. For example, historical messages may be labelled with identifiers of intents. As an example, a chat message "is the price negotiable" may be labelled with an intent "about-price-negotiable". Here, a word embedding "negotiable" and "price" may be used to identify the intent of this chat message.

The labeled training data may be input into the intent classification model 300 for training the intent classification model 300 to assign intent to chat messages during the second step. Initially, the input layer of the intent classification model 300 may be embedded with a default set of unigrams/bigrams for use in intent mining. As the model is trained, additional embeddings (unigrams, bigrams, etc.) may be identified for use in intent mining and added to the input layer by the user (e.g., based on inputs via a user interface) or automatically by the service training the model. Furthermore, during training the chat messages may be cleaned up (e.g., removing stop words, refining/clarifying misspellings, etc., and the like). The chat messages may be converted into vector form (numerical form) before they are input into the intent classification model 300 using a word-to-vector program. The trained intent classification model may be stored on the host platform for use by the chatbot service 133.

During operation, in the third and further steps, the trained intent classification model 300 may receive a chat message during a live conversation between two users and predict an intent of the chat message using the trained intent classification model 300. Based on the intent, the chatbot service 133 may identify a smart response (or a set of smart responses) that are mapped to the intent. Here, the smart response(s) may be output by a chatbot into a chat window that includes the first and second users. In some cases, the smart response is only output to one of the users (i.e., the user that received the chat message) as suggested responses that can be used by the user. As another example, the smart response may be automatically submitted on behalf of the user as an answer to the chat message. The smart suggestion may be based on previous reply messages, data about the item extracted from a web listing, inspection records, vehicle reports, and the like. Whether to automatically reply or provide a smart suggestion may be based on the confidence score.

Figure 5:
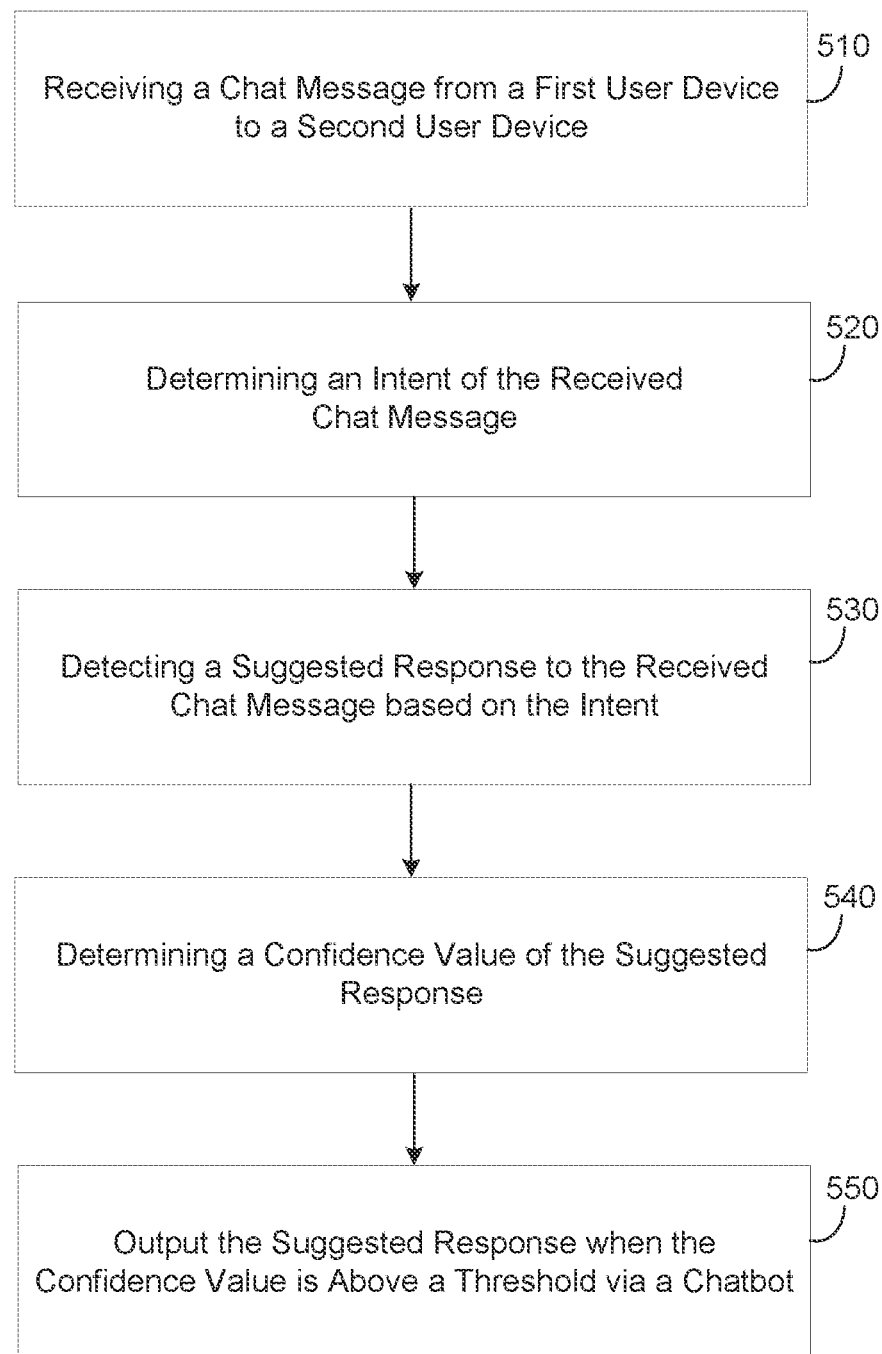
FIG. 5 is a diagram illustrating a method of generating and outputting a smart response via a chatbot in accordance with an example embodiment.

FIG. 5 illustrates a method 500 of generating and outputting a smart response via a chatbot in accordance with an example embodiment. For example, the method 500 may be performed by a host platform such as a web server, a cloud platform, a database, and/or the like. In some embodiments, the method 500 may be performed by a host of a mobile application or a website, however embodiments are not limited thereto.

Referring to FIG. 5, in 510, the method may include receiving a chat message transmitted from a first user device to a second user device via a chat application. For example, the chat message may be submitted by a potential buyer to a seller of an item for sale. Here, the item may be any type of product or service. In some examples, the item is referred to as a vehicle, but embodiments are not limited thereto. The chat message may include text content with questions and other requests for information submitted by a potential buyer of the item to the seller. The messages exchanged between the first and second user devices may pass through the host platform where they are analyzed and smart responses are generated.

In 520, the method may include determining, via a machine learning model, an intent of the received chat message based on content included in the received chat message. For example, the machine learning model may include an intent classification model that comprises a bidirectional long short-term memory (Bi-LSTM) architecture. In some embodiments, the determining may include determining the intent of the received chat message during execution of the Bi-LSTM based on word embeddings of intent topics within an input layer of the Bi-LSTM.

In 530, the method may include detecting a suggested response to the received chat message based on the determined intent and external data collected from one or more of a website and previous chat messages. In 540, the method may include determining a confidence value of the suggested response. Furthermore, in 550, the method may include outputting the suggested response when the confidence value is above a predetermined threshold. via a chatbot of the chat application that is displayed within a user interface of the chat application on at least one of the first user device and the second user device. Here, the method may output the suggested response to the first user device and the second user device on behalf of the second user if the confidence value is above an upper confidence value threshold. As another example, the method may include only displaying the suggested response to the second user device when the confidence value is between the upper threshold and an intermediate or lower threshold.

In some embodiments, the received chat message may include a request associated with an object, and the detecting may include detecting the plurality of recommended responses from descriptive content extracted from a web page that describes the object. In some embodiments, the received chat message may include a request associated with an object, and the detecting comprises detecting the plurality of recommended responses from descriptive content extracted from previous chat messages submitted from the second user device. In some embodiments, the detecting may include extracting only previous chat messages that have occurred within a start time and an end time of a dynamic sliding window of time.

In some embodiments, the method may further include assigning a plurality of confidence scores to the plurality of recommended responses, respectively, based on data sources of content included in the plurality of recommended responses, and selecting the recommended response from the plurality of recommended responses based on the plurality of confidence scores. In some embodiments, the outputting may include outputting the recommended response as a suggested response to the user interface of the chat application on only the second user device without outputting the suggested response to a user interface of the chat application on the first user device.

The above embodiments may be implemented in hardware, in a computer program executed by a processor, in firmware, or in a combination of the above. A computer program may be embodied on a non-transitory computer readable medium, such as a storage medium or storage device. For example, a computer program may reside in random access memory ("RAM"), flash memory, read-only memory ("ROM"), erasable programmable read-only memory ("EPROM"), electrically erasable programmable read-only memory ("EEPROM"), registers, hard disk, a removable disk, a compact disk read-only memory ("CD-ROM"), or any other form of non-transitory storage medium known in the art.

Figure 6:
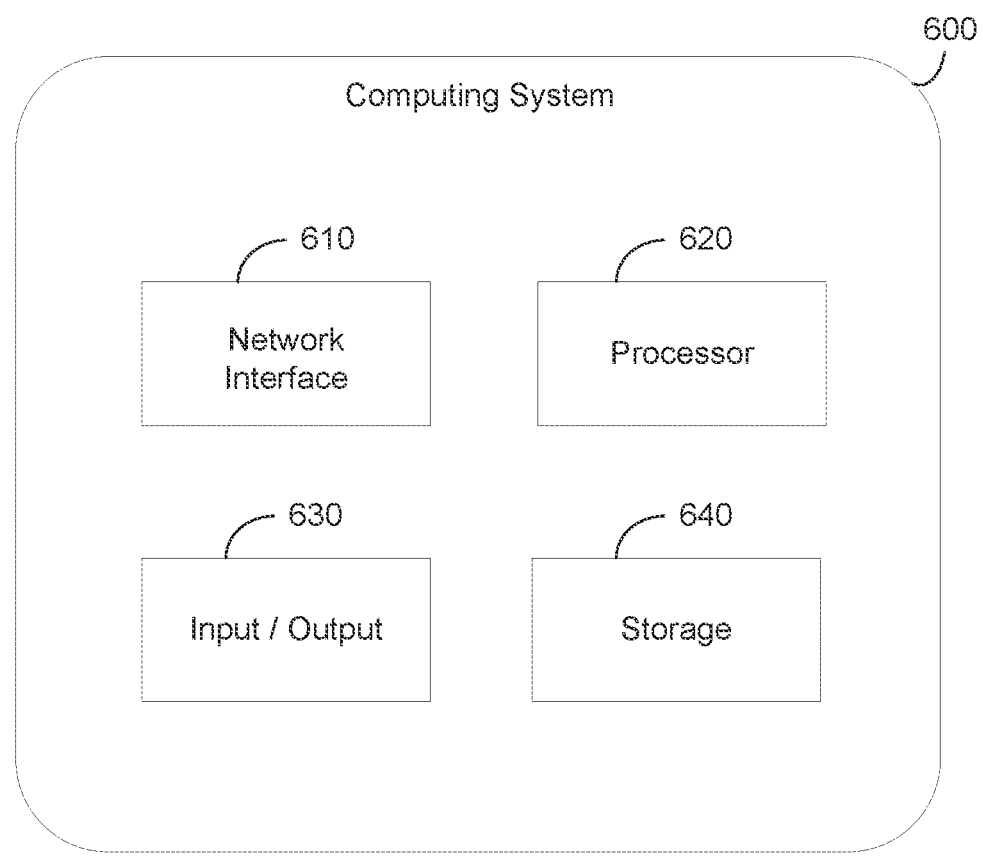
FIG. 6 is a diagram illustrating a computing system for performing the methods and processes of the example embodiments.

A storage medium may be coupled to the processor such that the processor may read information from, and write information to, the storage medium. In an alternative, the storage medium may be integral to the processor. The processor and the storage medium may reside in an application specific integrated circuit ("ASIC"). In an alternative, the processor and the storage medium may reside as discrete components. For example, FIG. 6 illustrates an example computer system 600 which may represent or be integrated in any of the above-described components, etc. FIG. 6 is not intended to suggest any limitation as to the scope of use or functionality of embodiments of the application described herein. The computing system 600 is capable of being implemented and/or performing any of the functionality set forth hereinabove.

The computing system 600 may include a computer system/server, which is operational with numerous other general purpose or special purpose computing system environments or configurations. Examples of well-known computing systems, environments, and/or configurations that may be suitable for use as computing system 600 include, but are not limited to, personal computer systems, cloud platforms, server computer systems, thin clients, thick clients, hand-held or laptop devices, tablets, smart phones, databases, multiprocessor systems, microprocessor-based systems, set top boxes, programmable consumer electronics, network PCs, minicomputer systems, mainframe computer systems, distributed cloud computing environments, and the like, which may include any of the above systems or devices, and the like. According to various embodiments described herein, the computing system 600 may be a web server.

The computing system 600 may be described in the general context of computer system-executable instructions, such as program modules, being executed by a computer system. Generally, program modules may include routines, programs, objects, components, logic, data structures, and so on that perform particular tasks or implement particular abstract data types. The computing system 600 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 6, the computing system 600 is shown in the form of a general-purpose computing device. The components of computing system 600 may include, but are not limited to, a network interface 610, a processor 620, an input/output 630 which may include a port, an interface, etc., or other hardware, for inputting and/or outputting a data signal from/to another device such as a display, a printer, etc., and a storage 640 which may include a system memory, or the like. Although not shown, the computing system 600 may also include a system bus that couples various system components including system memory to the processor 620. In some embodiments, the input/output 630 may also include a network interface.

The storage 640 may include a variety of computer system readable media. Such media may be any available media that is accessible by computer system/server, and it may include both volatile and non-volatile media, removable and non-removable media. System memory, in one embodiment, implements the flow diagrams of the other figures. The system memory can include computer system readable media in the form of volatile memory, such as random-access memory (RAM) and/or cache memory. As another example, the storage 640 can read and write to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to the bus by one or more data media interfaces. As will be further depicted and described below, storage 640 may include at least one program product having a set (e.g., at least one) of program modules that are configured to carry out the functions of various embodiments of the application.

As will be appreciated by one skilled in the art, aspects of the present application may be embodied as a system, method, or computer program product. Accordingly, aspects of the present application may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present application may take the form of a computer program product embodied in one or more computer readable medium(s) having computer readable program code embodied thereon.

Although not shown, the computing system 600 may also communicate with one or more external devices such as a keyboard, a pointing device, a display, etc.; one or more devices that enable a user to interact with computer system/server; and/or any devices (e.g., network card, modem, etc.) that enable computing system 600 to communicate with one or more other computing devices. Such communication can occur via I/O interfaces. Still yet, computing system 600 can communicate with one or more networks such as a local area network (LAN), a general wide area network (WAN), and/or a public network (e.g., the Internet) via network interface 610. As depicted, network interface 610 may also include a network adapter that communicates with the other components of computing system 600 via a bus. Although not shown, other hardware and/or software components could be used in conjunction with the computing system 600. Examples include, but are not limited to, microcode, device drivers, redundant processing units, external disk drive arrays, RAID systems, tape drives, and data archival storage systems, etc.

It will be readily understood that descriptions and examples herein, as generally described and illustrated in the figures, may be arranged and designed in a wide variety of different configurations. Thus, the detailed description of the embodiments is not intended to limit the scope of the application as claimed but is merely representative of selected embodiments of the application. One of ordinary skill in the art will readily understand that the above may be practiced with steps in a different order, and/or with hardware elements in configurations that are different than those which are disclosed. Therefore, although the application has been described based upon some preferred embodiments, it would be apparent to those of skill in the art that certain modifications, variations, and alternative constructions would be apparent.

What is claimed is:

1. A computing system comprising:
   a network interface configured to receive a chat message transmitted from a first user device to a second user device via a message window of a chat application, wherein the chat message comprises content associated with an object; and
   a processor configured to
      determine, via a machine learning model, an intent of the received chat message based on content included in the received chat message;
      collect content of the object stored on a website based on the determined intent;
      detect a suggested response of a user of the second user device to the received chat message based on the determined intent and the content of the object collected from the website based on the determined intent;
      determine a confidence value for the suggested response of the user based on a source of the suggested response; and
      output the suggested response on behalf of the user of the second device within the message window displayed on the second user device via a chatbot of the chat application based on the determined confidence value.

2. The computing system of claim 1, wherein the machine learning model comprises an intent classification model that comprises a bidirectional long short-term memory (Bi-LSTM) architecture.

3. The computing system of claim 2, wherein the processor is configured to determine the intent of the received chat message based on word embeddings of intent topics within an input layer of the Bi-LSTM.

4. The computing system of claim 1, wherein the received chat message comprises a question about the object, and the processor is configured to detect the suggested response from a product description of the object extracted from a web page of the website.

5. The computing system of claim 1, wherein the processor is further configured to detect the suggested response from descriptive content extracted from previous chat messages by the second user device associated with the object.

6. The computing system of claim 5, wherein the processor is configured to extract previous chat messages from within a dynamic sliding window of time, only.

7. The computing system of claim 1, wherein the processor is further configured to assign the confidence value to the suggested response based on the website from where the content was collected.

8. The computing system of claim 1, wherein the processor is configured to output the suggested response to the user interface of the chat application on only the second user device without outputting the suggested response to a user interface of the chat application on the first user device based on the confidence value.

9. A method comprising:
   receiving a chat message transmitted from a first user device to a second user device via a message window of a chat application, wherein the chat message comprises content associated with an object;
   determining, via a machine learning model, an intent of the received chat message based on content included in the received chat message;
   collecting content of the object stored on a website based on the determined intent;
   detecting a suggested response of a user of the second user device to the received chat message based on the determined intent and the content of the object collected from the website based on the determined intent;
   determining a confidence value for the suggested response based on a source of the suggested response; and
   outputting the suggested response on behalf of the user of the second device within the message window displayed on the second user device via a chatbot of the chat application based on the determined confidence value.

10. The method of claim 9, wherein the machine learning model comprises an intent classification model that comprises a bidirectional long short-term memory (Bi-LSTM) architecture.

11. The method of claim 10, wherein the determining comprises determining the intent of the received chat message during execution of the Bi-LSTM based on word embeddings of intent topics within an input layer of the Bi-LSTM.

12. The method of claim 9, wherein the received chat message comprises a question about the object, and the detecting comprises detecting the suggested response from a product description of the object extracted from a web page of the website.

13. The method of claim 9, wherein the detecting further comprises detecting the at least one suggested response from descriptive content extracted from previous chat messages submitted from the second user device.

14. The method of claim 13, wherein the detecting comprises extracting previous chat messages from within a start time and an end time of a dynamic sliding window of time, only.

15. The method of claim 9, wherein the method further comprises assigning the confidence value to the suggested response based on the website from where the content was collected.

16. The method of claim 9, wherein the outputting comprises outputting the suggested response to the user interface of the chat application on only the second user device without outputting the suggested response to a user interface of the chat application on the first user device based on the confidence value.

17. A non-transitory computer-readable medium comprising instructions which when executed by a processor cause a computer to perform a method comprising:
   receiving a chat message transmitted from a first user device to a second user device via a message window of a chat application, wherein the chat message comprises content associated with an object;
   determining, via a machine learning model, an intent of the received chat message based on content included in the received chat message;
   collecting content of the object stored on a website based on the determined intent;
   detecting a suggested response of a user of the second user device to the received chat message based on the determined intent and the content of the object collected from the website based on the determined intent;
   determining a confidence value for the suggested response based on a source of the suggested response; and
   outputting the suggested response on behalf of the user of the second device within the message window displayed on the second user device via a chatbot of the chat application based on the determined confidence value.

18. The non-transitory computer-readable medium of claim 17, wherein the machine learning model comprises an intent classification model that comprises a bidirectional long short-term memory (Bi-LSTM) architecture.

19. The non-transitory computer-readable medium of claim 18, wherein the determining comprises determining the intent of the received chat message during execution of the Bi-LSTM based on word embeddings of intent topics within an input layer of the Bi-LSTM.

20. The non-transitory computer-readable medium of claim 17, wherein the method further comprises assigning the confidence value to the suggested response based on the website from where the content was collected.

* * * * *